United States Patent
Watanabe

(10) Patent No.: US 7,502,142 B2
(45) Date of Patent: Mar. 10, 2009

(54) IMAGE DATA PROCESSING SYSTEM

(75) Inventor: Takeshi Watanabe, Nagoya (JP)

(73) Assignee: Brother Kogyo Kabushiki Kaisha, Nagoya (JP)

(*) Notice: Subject to any disclaimer, the term of this patent is extended or adjusted under 35 U.S.C. 154(b) by 812 days.

(21) Appl. No.: 11/020,118

(22) Filed: Dec. 27, 2004

(65) Prior Publication Data
US 2005/0141001 A1 Jun. 30, 2005

(30) Foreign Application Priority Data
Dec. 26, 2003 (JP) ............................. 2003-435245

(51) Int. Cl.
H04N 1/40 (2006.01)

(52) U.S. Cl. ........................................ 358/3.1; 358/3.26

(58) Field of Classification Search ......... 358/3.09–3.1, 358/2.1, 1.9, 3.14, 3.26–3.27, 468; 382/162, 382/167
See application file for complete search history.

(56) References Cited

U.S. PATENT DOCUMENTS

| | | | | |
|---|---|---|---|---|
| 5,621,480 A * | 4/1997 | Hanai | ............ | 348/679 |
| 6,233,061 B1 * | 5/2001 | Huang et al. | ............ | 358/1.9 |
| 7,260,258 B2 * | 8/2007 | Foote et al. | ............ | 382/167 |

* cited by examiner

Primary Examiner—Thomas D Lee
Assistant Examiner—Stephen M Brinich
(74) Attorney, Agent, or Firm—Oliff & Berridge, PLC

(57) ABSTRACT

In an image data processing device, a notice pixel is selected from among a plurality of pixels constituting an image. A specified direction in which ink ejected on a recording medium would bleed by a relatively large amount on the recording medium is obtained. Then, a color-difference vector indicative of the magnitude and direction of a color-difference between the notice pixel and neighboring pixels disposed adjacent thereto is calculated, and a directional component which is a component of the color-difference vector in the specified direction is calculated. Further, a total density value which is a sum of the density value of the notice pixel and density values of the neighboring pixels is calculated, and a density reduction value is determined according to the directional component and the total density value. Then, the density value of the notice pixel is reduced by an amount represented by the density reduction value.

34 Claims, 10 Drawing Sheets

FIG. 8

| -1 | 0 | 1 |
|---|---|---|
| -1 | 0 | 1 |
| -1 | 0 | 1 |

FIG. 9

| -1 | -1 | -1 |
|---|---|---|
| 0 | 0 | 0 |
| 1 | 1 | 1 |

| | DIRECTIONAL COMPONENT(C) | | | |
|---|---|---|---|---|
| | A1≦C<A2 | A2≦C<A3 | A3≦C<A4 | A4≦C<A5 |
| TOTAL NEIGHBORING DENSITY(E) B1≦E<B2 | D1 | D2 | D3 | D4 |
| B2≦E<B3 | D5 | D6 | D7 | D8 |
| B3≦E<B4 | D9 | D10 | D11 | D12 |
| B4≦E<B5 | D13 | D14 | D15 | D16 |

ENLARGED VIEW OF FABRIC

GROOVE DIRECTION

ENLARGED VIEW OF FABRIC

GROOVE DIRECTION

IMAGE DATA PROCESSING SYSTEM

BACKGROUND OF THE INVENTION

The present invention relates to image data processing method, program, system, and various devices such as a printing data creating apparatus, an inkjet printing apparatus employing such method, program and system.

Conventionally, an inkjet printing apparatus has been well known and widely used. The inkjet printing apparatus is typically configured such that ink is directed from an ink supplying source to a plurality of ink ejection channels of an inkjet head, and, by selectively driving actuators such as heater elements or piezoelectric elements, a jet of ink is ejected from ejection nozzles provided at the tip of the ejection channels.

In order to produce a color image, for each of the pixels making up the color image, the color is divided into three primary colors of, for example, cyan (C), magenta (M), yellow (Y), and then ink having each color is ejected with the density thereof being adjusted based on the density of the corresponding color component. As the density-adjusted color inks are mixed, the pixel of the color image is produced.

A black pixel is formed as a mixed color which is a mixture of the three primary colors having the maximum densities, respectively. Since black color recreated as the mixed color tends to be dull black, or unclear due to its low contrast. Therefore, black (K) ink is generally ejected to recreate black color for a black pixel or pixels which contain black color as color component.

Incidentally, after the ink is ejected onto a recording sheet and before permeates into the sheet, neighboring ink having different colors may mix to cause a blot. Since black ink has especially much color difference from the primary color ink (cyan, magenta, yellow), the blot comes into prominence so that quality of the printed image is deteriorated.

U.S. Pat. Nos. 6,084,604 and 6,312,102 disclose method and apparatus for suppressing the above deficiency, teachings of which are incorporated herein by reference. According to the disclosure of the above patents, when a black pixel is to be formed next to color pixels, black ink is not used and the black pixel is formed using the mixed color ink.

Japanese Patent Provisional Publication No. 2000-118007 discloses method and apparatus which distinguishes skeleton pixels from contour pixels in a solid area, and ejecting more ink for the skeleton pixels, while less ink for the contour pixels, thereby blots can be reduced at the boundary between the contour pixels and an unprinted area.

According to the method and apparatus disclosed in the above US patents, however, there is a problem. If the black ink is substituted with the mixture of the color inks, the total amount of the ink used for the black pixels increases and a longer time is required until the ink permeates into the recording sheet, and the blot may easily be cause. Besides, if adjoining color pixels have different colors and relatively high densities, the blot is easily formed. If the color difference between the pixels is relatively large, the bolt is significant.

According to the above-described JP publication, since only the area where the RGB gray-scale values are set to zero, that is, only the black area is regarded as the solid pixel area, the blot cannot be reduced when different color pixels of high densities lie next to each other.

Further to the blot between the color pixels described above, the following problem should also be considered.

When fabrics such as T-shirt are used as the recording medium, grooves are formed on a fabric surface depending on kinds and/or materials of the fabrics, and depending on the stitching methods including sewing, knitting and weaving. When the grooves are formed, the ink tends to bleed along the direction the grooves extend.

FIG. 15 is an enlarged view of an example of the fabric formed with the grooves. As shown in FIG. 15, a part of the knitted (woven) yarns which are raised on the surface is indicated in black, showing that the yarns are knitted (woven) in the direction from the lower left to the upper right in the drawing. The grooves produced between the yarns are indicated in white. Those grooves are also formed in the direction from the lower left to the upper right in the drawing. When printing is carried out on the fabric such as T-shirt, the ink moves more, after having been ejected onto the fabric, in the direction where the grooves extend, than other directions on the fabric. Accordingly, the ink tends to bleed along the direction in which the grooves extend (the direction from the lower left to the upper right in FIG. 15). The aforementioned prior art was intended to reduce the blot of the neighboring ink, but not intended to reduce the bleeding caused due to the reason peculiar to the fabric.

SUMMARY OF THE INVENTION

The present invention is advantageous in that system, method and program that can suppress the bleeding of the ink ejected onto the fabric are provided.

According to an aspect of the invention, there is provided an image data processing device, which is provided with a pixel selecting system that selects a notice pixel from among a plurality of pixels constituting an image, all the plurality of pixels being determined as the notice pixel sequentially, a specified direction inputting system through which a specified direction is input, the specified direction being a direction in which ink ejected on a recording medium would move by a relatively large amount on the recording medium, a color-difference vector calculating system that calculates a color-difference vector indicative of the magnitude and direction of a color-difference between the notice pixel selected by the pixel selecting system and neighboring pixels disposed adjacent to the notice pixel, a directional component calculating system that calculates a directional component which is a component of the color-difference vector in the specified direction, a neighboring total density value calculating system that calculates a total density value which is a sum of the density value of the notice pixel and density values of the neighboring pixels located adjacent to the notice pixel, a density reduction value determining system that determines a density reduction value according to the directional component calculated by the directional component calculating system and the total density value calculated by the neighboring total density value calculating system, and a density value reducing system that reduces the density value of the notice pixel by an amount represented by the density reduction value determined by the density reduction value deciding system.

According to another aspect of the invention, there is provided with a method of processing image data, which includes (a) selecting a notice pixel from among a plurality of pixels constituting an image, all the plurality of pixels being determined as the notice pixel sequentially, (b) obtaining a specified direction in which ink ejected on a recording medium would move by a relatively large amount on the recording medium, (c) first calculating a color-difference vector indicative of the magnitude and direction of a color-difference between the notice pixel and neighboring pixels disposed adjacent to the notice pixel, (d) second calculating a directional component which is a component of the color-difference vector in the specified direction, (e) third calculating a total density value which is a sum of the density value of the notice pixel and density values of the neighboring pixels, (f) determining a density reduction value according to the directional component and the total density value, and (g) reducing the density value of the notice pixel by an amount represented by the density reduction value.

Optionally, the determining may determine the reduction value such that the reduction value is greater as the total density value is greater.

Still optionally, the determining may determine the reduction value such that the reduction value is greater as the directional component is greater.

Further optionally, the first calculating may calculate the color-difference in accordance with brightness of the notice pixel and brightness of the neighboring pixels.

Furthermore, the inputting may include selecting one of a plurality of specified directional patterns, and the second calculating may calculate the directional component of the color-difference vector in the selected specified direction.

Further, the inputting may include (1) specifying at least one of a material and a stitching method of the recording medium, and (2) identifying the specified direction for the recording medium from among a plurality of specified directional patterns according to the at least one of the material and stitching method of the recording medium, and the second calculating may calculate the directional component of the color-difference vector in the identified specified direction.

Furthermore, the third calculating may include (1) comparing the directional component with a predetermined threshold value, (2) comparing the neighboring total density value with a first threshold value, and (3) comparing the total density value with a second threshold value which is greater than the first threshold value, and when the directional component is greater than the threshold value, the reduction value is determined as a first reduction value if the total density value is smaller than the second threshold value, while the reduction value is determined as a second reduction value if the total density value is greater than the second threshold value.

According to a further aspect of the invention, there is provided a computer program product having computer readable instructions that cause a computer to (a) select a notice pixel from among a plurality of pixels constituting an image, all the plurality of pixels being determined as the notice pixel sequentially, (b) obtain a specified direction in which ink ejected on a recording medium would move by a relatively large amount on the recording medium, (c) first calculate a color-difference vector indicative of the magnitude and direction of a color-difference between the notice pixel and neighboring pixels disposed adjacent to the notice pixel, (d) second calculate a directional component which is a component of the color-difference vector in the specified direction, (e) third calculate a total density value which is a sum of the density value of the notice pixel and density values of the neighboring pixels, (f) determine a density reduction value according to the directional component and the total density value, and (g) reduce the density value of the notice pixel by an amount represented by the density reduction value.

According to a furthermore aspect of the invention, there is provided a printing system that includes an image data creating apparatus that creates image data, an image processing device that processes the image data to generate processed image data, a printing data generating device that converts the processed image data to printing data, and an inkjet printer which ejects ink onto a recording medium in accordance with the printing data. The printing system is configured such that the image processing device includes a pixel selecting system that selects a notice pixel from among a plurality of pixels constituting an image, all the plurality of pixels being determined as the notice pixel sequentially, a specified direction inputting system through which a specified direction is input, the specified direction being a direction in which ink ejected on a recording medium would move by a relatively large amount on the recording medium, a color-difference vector calculating system that calculates a color-difference vector indicative of the magnitude and direction of a color-difference between the notice pixel selected by the pixel selecting system and neighboring pixels disposed adjacent to the notice pixel, a directional component calculating system that calculates a directional component which is a component of the color-difference vector in the specified direction, a neighboring total density value calculating system that calculates a total density value which is a sum of the density value of the notice pixel and density values of the neighboring pixels located adjacent to the notice pixel, a density reduction value determining system that determines a density reduction value according to the directional component calculated by the directional component calculating system and the total density value calculated by the neighboring total density value calculating system, and a density value reducing system that reduces the density value of the notice pixel by an amount represented by the density reduction value determined by the density reduction value deciding system.

Optionally, the image data creating device may include the image data processing device and the printing data generating device, the image data creating device further including a printing data transmitting device that transmits the printing data to the inkjet printer.

Alternatively, the image data creating device may include an image data transmitting device that transmits the image data to the inkjet printer. Further, the inkjet printer may include the image data processing device and the printing data generating device, the image data processing device processed the image data received from the image data creating device, the processed image data being converted into the printing data, the inkjet printer carrying out a printing operation based on the printing data.

According to another aspect of the invention, there is provided a printing data creating device, which includes an image data creating system that is used to create image data representing an image to be printed by an inkjet printer, an image data processing system that processes the image data created by the image data creating system, the image data processing system including, a pixel selecting system that selects a notice pixel from among a plurality of pixels constituting the image to be printed, all the plurality of pixels being determined as the notice pixel sequentially, a specified direction inputting system through which a specified direction is input, the specified direction being a direction in which ink ejected on a recording medium would move by a relatively large amount on the recording medium, a color-difference vector calculating system that calculates a color-difference vector indicative of the magnitude and direction of a color-difference between the notice pixel selected by the pixel selecting system and neighboring pixels disposed adjacent to the notice pixel, a directional component calculating system that calculates a directional component which is a component of the color-difference vector in the specified direction, a neighboring total density value calculating system that calculates a total density value which is a sum of the density value of the notice pixel and density values of the neighboring pixels located adjacent to the notice pixel, a density reduction value determining system that determines a density reduction value according to the directional component calculated by the directional component calculating system and the total density value calculated by the neighboring total density value calculating system, and a density value reducing system that reduces the density value of the notice pixel by an amount represented by the density reduction value determined by the density reduction value deciding system, a printing data generating system that generates printing data in accordance with the processed image data, and a printing data transmitting system that transmits the printing data to the inkjet printer.

According to another aspect of the invention, there is provided an inkjet printer, which includes a data receiving system that receives image data created outside the inkjet printer, an image data processing system that processes the image data received by the data receiving system. The image data processing system is provided with a pixel selecting system that selects a notice pixel from among a plurality of pixels constituting the image to be printed, all the plurality of pixels being determined as the notice pixel sequentially, a specified direction inputting system through which a specified direction is input, the specified direction being a direction in which ink ejected on a recording medium would move by a relatively large amount on the recording medium, a color-difference vector calculating system that calculates a color-difference vector indicative of the magnitude and direction of a color-difference between the notice pixel selected by the pixel selecting system and neighboring pixels disposed adjacent to the notice pixel, a directional component calculating system that calculates a directional component which is a component of the color-difference vector in the specified direction, a neighboring total density value calculating system that calculates a total density value which is a sum of the density value of the notice pixel and density values of the neighboring pixels located adjacent to the notice pixel, a density reduction value determining system that determines a density reduction value according to the directional component calculated by the directional component calculating system and the total density value calculated by the neighboring total density value calculating system, and a density value reducing system that reduces the density value of the notice pixel by an amount represented by the density reduction value determined by the density reduction value deciding system. The inkjet printer further include a printing data generating system that generates printing data in accordance with the processed image data, the inkjet printer carrying out a printing operation based on the printing data.

In the printing data creating device or the inkjet printer above, the density reduction value determining system may determine the reduction value such that the reduction value is greater as the total density value is greater.

Optionally, the density reduction value determining system may determine the reduction value such that the reduction value is greater as the directional component is greater.

Further optionally, the color-difference vector calculating system may calculate the color-difference in accordance with a brightness of the notice pixel and brightness of the neighboring pixels.

Still optionally, the specified direction inputting system may include a specified directional pattern storing system that stores a plurality of specified directional patterns, and a direction selecting system that is operable to select one of the plurality of specified directional patterns stored in the specified directional pattern storing system. In this case, the directional component calculating system may calculate the directional component of the color-difference vector in the specified direction selected by the directional selecting system.

Further optionally, the specified direction inputting system may include a specified directional pattern storing system that stores a plurality of specified directional patterns, a recording medium specifying system that is operable to specify at least one of a material and a stitching method of the recording medium, and a specified direction identifying system that identifies the specified direction for the recording medium from among the plurality of specified directional patterns stored in the specified directional pattern storing system according to the at least one of the material and stitching method of the recording medium. In this case, the directional component calculating system may calculate the directional component of the color-difference vector in the specified direction selected by the directional selecting system.

Furthermore optionally, the neighboring total density value calculating system may include a directional component comparing system that compares the directional component calculated by the directional component calculating system with a predetermined threshold value, a first total density value comparing system that compares the neighboring total density value calculated by the neighboring total density value calculating system with a first threshold value, and a second total density value comparing system that compares the total density value calculated by the neighboring total density value calculating system with a second threshold value which is greater than the first threshold value. In this case, when the directional component comparing system determines the directional component is greater than the predetermined threshold value, the density reduction value determining system determines the reduction value as a first reduction value if the total density value is smaller than the second threshold value, while the density reduction value determining system determines the reduction value as a second reduction value if the total density value is greater than the second threshold value.

BRIEF DESCRIPTION OF THE ACCOMPANYING DRAWINGS

FIG. 8 is an example of an X-direction first-order differential filter filtering L*a*b* data to obtain the color-difference vector of the notice pixel;

FIG. 9 is an example of a Y-direction first-order differential filter filtering the L*a*b* data to obtain the color-difference vector of the notice pixel;

DETAILED DESCRIPTION OF THE EMBODIMENT

Referring to the accompanying drawings, an embodiment of the present invention will be described hereinafter.

An image data processing device according to the present invention processes the image data which is created by application so that the blot of the ink ejected onto a fabric such as T-shirt before is suppressed.

As a first embodiment of the invention, there is described a personal computer 100 which processes image data created by application, to generate printing data for printing an image on a T-shirt with an inkjet printer 200 will be described as an example of a printing data creating apparatus equipped with an image data processing device.

As a second embodiment of the invention, there is described an inkjet printer 200 which receives the image data sent from the personal computer 100, processes the image data to generate printing data, and prints an image, in accordance with the thus generated printing data, on a T-shirt.

Firstly, with reference to FIGS. 1 to 6, the configurations of a personal computer 100 and a inkjet printer 200 according to the first and the second embodiments are explained.

Figure 1:
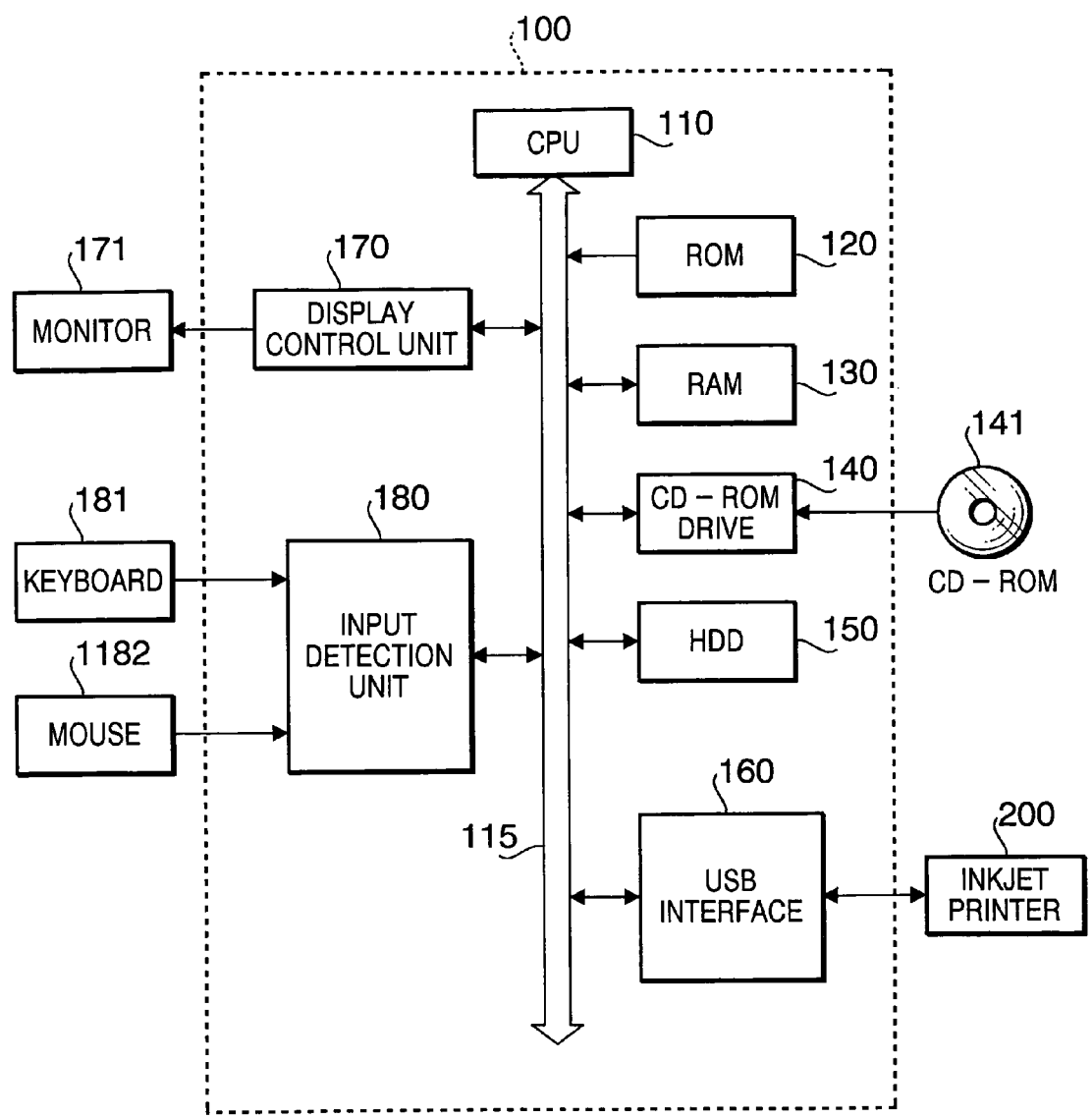
FIG. 1 is a block diagram showing a configuration of a personal computer according to the embodiments.
Figure 2:
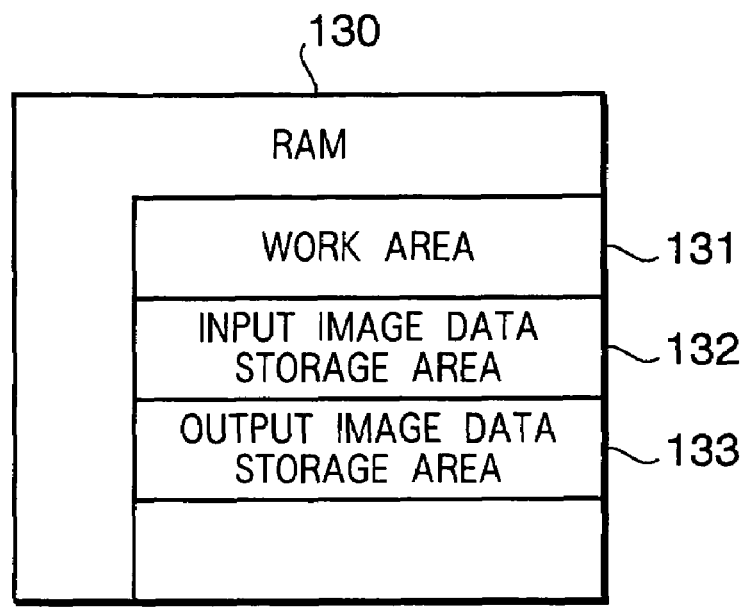
FIG. 2 is a conceptual diagram showing the configuration of a storage area of a RAM of the personal computer shown in FIG. 1.
Figure 3:
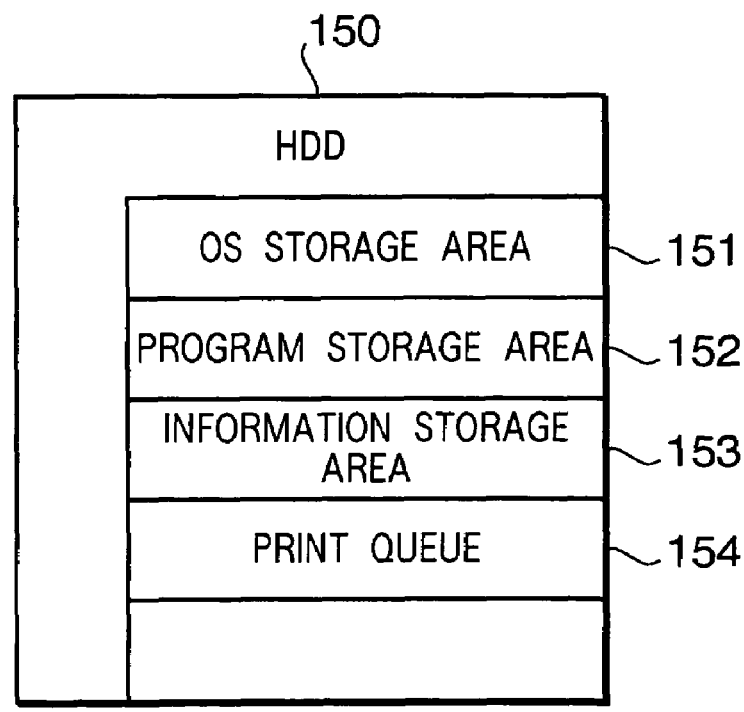
FIG. 3 is a conceptual diagram showing the configuration of a storage area of an HDD of the personal computer shown in FIG. 1.
Figure 4:
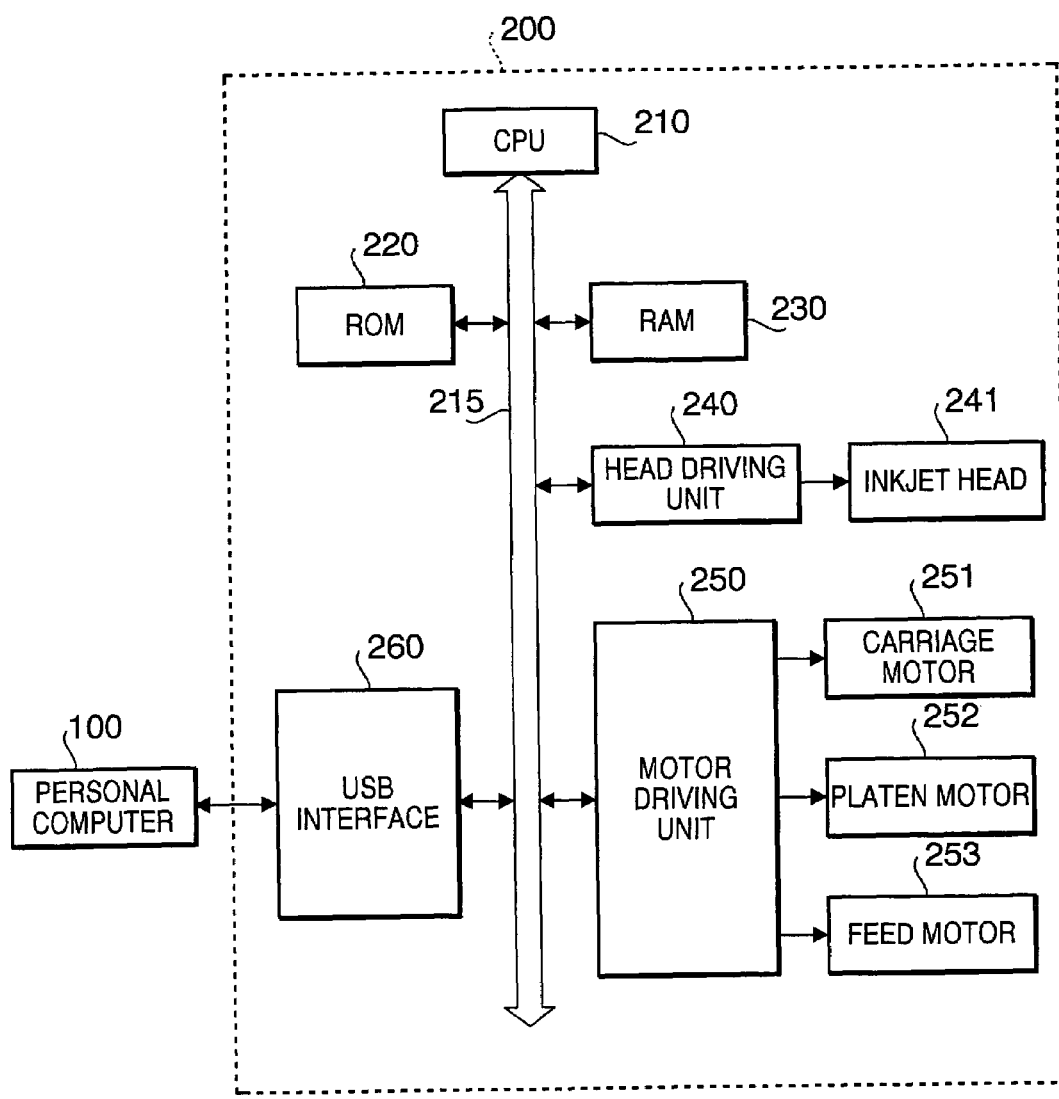
FIG. 4 is a block diagram showing the configuration of an inkjet printer according to the embodiments.
Figure 5:
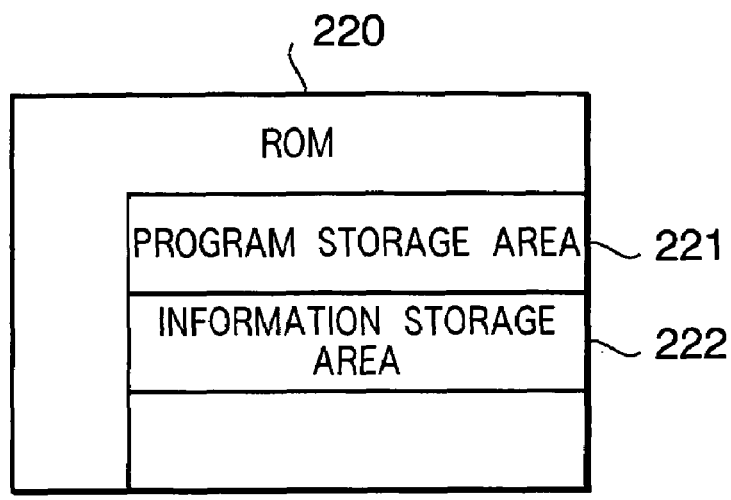
FIG. 5 is a conceptual diagram showing the configuration of a storage area of a ROM of the inkjet printer shown in FIG. 3.
Figure 6:
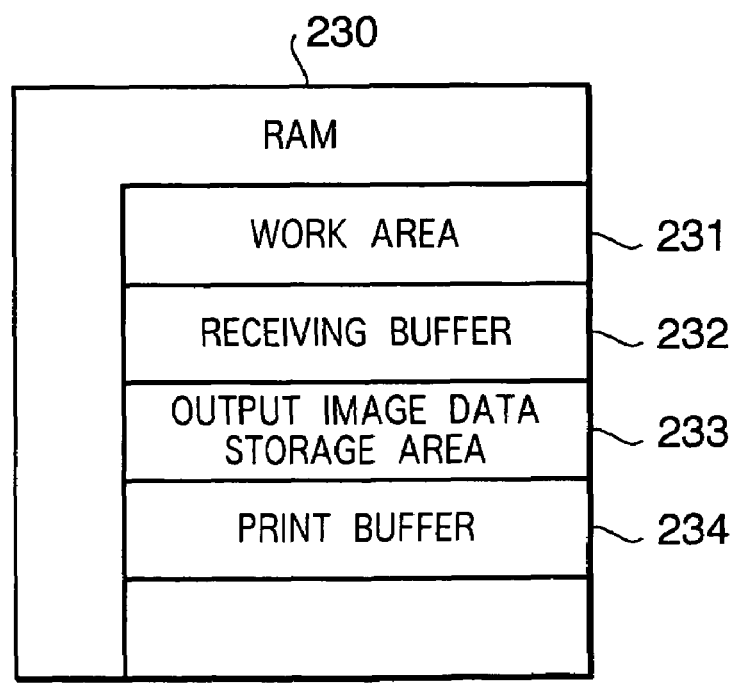
FIG. 6 is a conceptual diagram showing the configuration of a storage area of a RAM of the inkjet printer shown in FIG. 3.

FIG. 1 is a block diagram showing the configuration of the personal computer 100. FIG. 2 is a conceptual diagram showing the configuration of a storage area of a RAM 130 of the personal computer 100. FIG. 3 is a conceptual diagram showing the configuration of a storage area of an HDD 150 of the personal computer 100. FIG. 4 is a block diagram showing the configuration of the inkjet printer 200. FIG. 5 is a conceptual diagram showing the configuration of a storage area of a ROM 220 of the inkjet printer 200. FIG. 6 is a conceptual diagram showing the configuration of a storage area of a RAM 230 of the inkjet printer 200.

The personal computer 100 shown in FIG. 1 sends the printing data that is created by the image data processing device based on image data (in the first embodiment), and the image data, etc. (in the second embodiment), to the inkjet printer 200 which is connected, for example, through a communication cable according to a predetermined communication standard, such as a standard for USB in order to print the image data created by the application.

The inkjet printer 200 shown in FIG. 4 prints out an image on a recording medium such as a T-shirt according to the received printing data (in the first embodiment) or the image data (in the second embodiment). Specifically, in the second embodiment, the inkjet printer 200 processes the received image data using the image data processing device, and prints out an image on the recording medium according to the printing data created from the processed image data.

For this purpose, according to the first embodiment, the personal computer 100 executes an image data processing program (See FIG. 7) which is one of driver program modules for creating the printing data from the image data. According to the second embodiment, the inkjet printer 200 executes an image data processing program as one of the modules which are executed for creating the printing data from the received image data.

As shown in FIG. 1, the personal computer 100 has a CPU 110 which controls an entire operation of the personal computer 100. The CPU 110 is connected with a ROM 120 in which programs such as BIOS to be executed by the CPU 110 is stored, a RAM 130 in which data is temporarily stored, a CD-ROM drive 140 in which a CD-ROM 141 is inserted as a data storage medium, and a hard disk drive (hereinafter referred to as "HDD") as a data storage device via a bus 115.

Further, the CPU 110 is also connected, via the bus 115, with a USB interface 160 for communicating with external equipment including the inkjet printer 200, a display control unit 170 for processing an operation screen shown on a monitor 171 for the benefits of users, an input detecting unit 180 for detecting inputs, to which a keyboard 181 and a mouse 182 for inputting user's operation are connected. Besides, a floppy (registered trademark) disk drive, I/O unit for an audio signal and various interfaces (not shown) are also provided in the personal computer 100.

Figure 7:
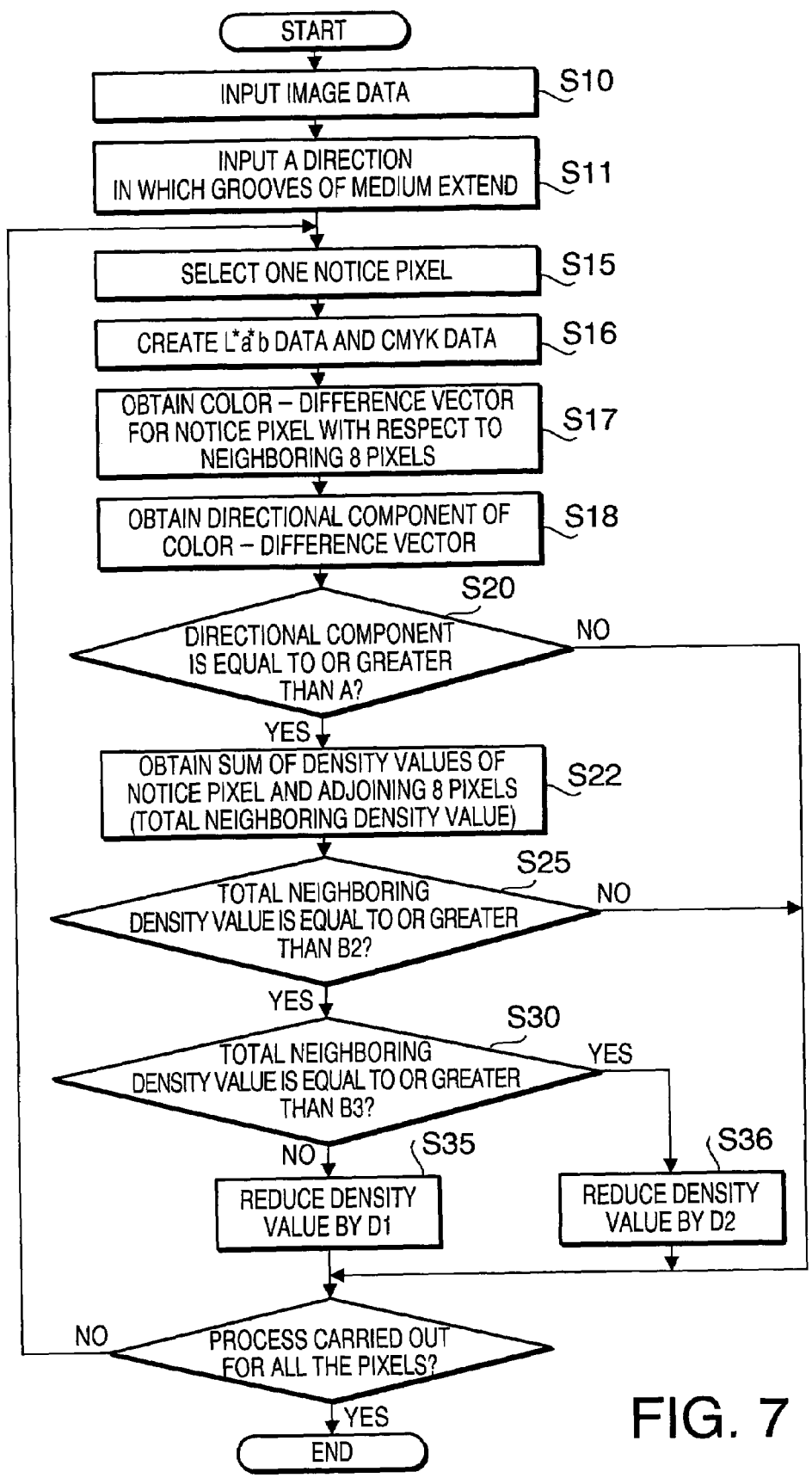
FIG. 7 is a flowchart of an image data processing procedure.

The image data processing procedure shown in FIG. 7, and settings and data to be used when the image data processing procedure is executed are stored in the CD-ROM 141. Such program and data are retrieved from the CD-ROM 141 and stored into a program storage area 152 and/or an information storage area (See FIG. 3) in the HDD 150 when the image data processing procedure is executed.

FIG. 2 is a conceptual diagram showing the configuration of a storage area of the RAM 130 of the personal computer 100. As shown in FIG. 2, the RAM 130 of the personal computer 100 has a work area 131 for storing temporary data during execution of programs, an input image data storage area 132 for temporarily storing the input image data, an output image data storage area 133 for storing the image data processed in accordance with the image data processing procedure in the first embodiment. The RAM 130 is also provided with various storage areas (not shown).

As shown in FIG. 3, the HDD 150 in the personal computer 100 has an operating system (OS) storage area 151 for storing various programs which executed by the CPU 110 to control the operation of the personal computer 100, a program storage area 152 for storing various programs to be executed in the personal computer 100 and the image data processing program according to the first embodiment, an information storage area 153 for storing information such as setting, initial value, data necessary for execution of programs, a printing queue 154 for temporarily storing the printing data created from the image data stored in the output image data storage area 133 (in the first embodiment) and the image data created by the application and to be transmitted to the inkjet printer 200 (in the second embodiment). Further, the HDD 150 is provided with other various storage areas (not shown).

As shown in FIG. 4, the inkjet printer 200 is provided with a CPU 210 which controls the entire operation of the inkjet printer 200. The CPU 210 is connected, via a bus 215, with a ROM 220 for storing a control program to control the operation of the inkjet printer 200 to be executed by the CPU 210, and a RAM 230 for temporarily storing data.

Moreover, a head driving unit 240 for driving a piezoelectric actuator (not shown) provided at each channel of the inkjet head 241 which emits a jet of ink, a motor driving unit 250 for controlling and driving a carriage motor 251 for driving a carriage (not shown) which carries the inkjet head 241, a platen motor 252 for driving a platen roller (not shown) which adjusts the timing and speed of a T-shirt fed to a platen (not shown) which holds the T-shirt, a fabric subjected to printing, during printing, a transfer motor 253 for driving a feed roller (not shown) which feeds the T-shirt, respectively, and a USB interface 260 for communicating with external equipment including the personal computer 100 by using a USB cable (not shown) connection are connected via a bus 215 to the CPU 210.

The carriage (not shown) of the inkjet printer 200 carries four piezoelectric inkjet heads 241. The four inkjet heads 241 are provided, for example, corresponding to cyan (C), magenta (M), yellow (Y), black (K), respectively, and equipped with, for example, 128 channels (not shown) for emitting a jet of each ink, respectively. Each channel is provided with a piezoelectric actuator (not shown), which is controlled so that droplets of ink are ejected from fine inkjet nozzles (not shown) formed on the inkjet surface of the inkjet head 241 corresponding to each channel.

As shown in FIG. 5, the ROM 220 of the inkjet printer 200 is provided with a program storage area 221, in which a control program for controlling the operation of the inkjet printer 200 are stored. In the second embodiment, the image data processing program is stored an information storage area 222 for storing information such as setting, initial value, data necessary for execution of programs. Moreover, the ROM 220 is provided with other various storage areas (not shown).

As shown in FIG. 6, a RAM 230 of the inkjet printer 200 is provided with a work area 231 for storing temporary data during execution of programs, a receiving buffer 232 for storing the received printing data (in the first embodiment) and the received image data (in the second embodiment), an output image data storage area 233 for storing the image data processed in the image data processing procedure (in the second embodiment), a printing buffer 234 for storing the printing data during printing. Further, the RAM 230 is also provided with other various storage areas (not shown).

Figures 8, 9:
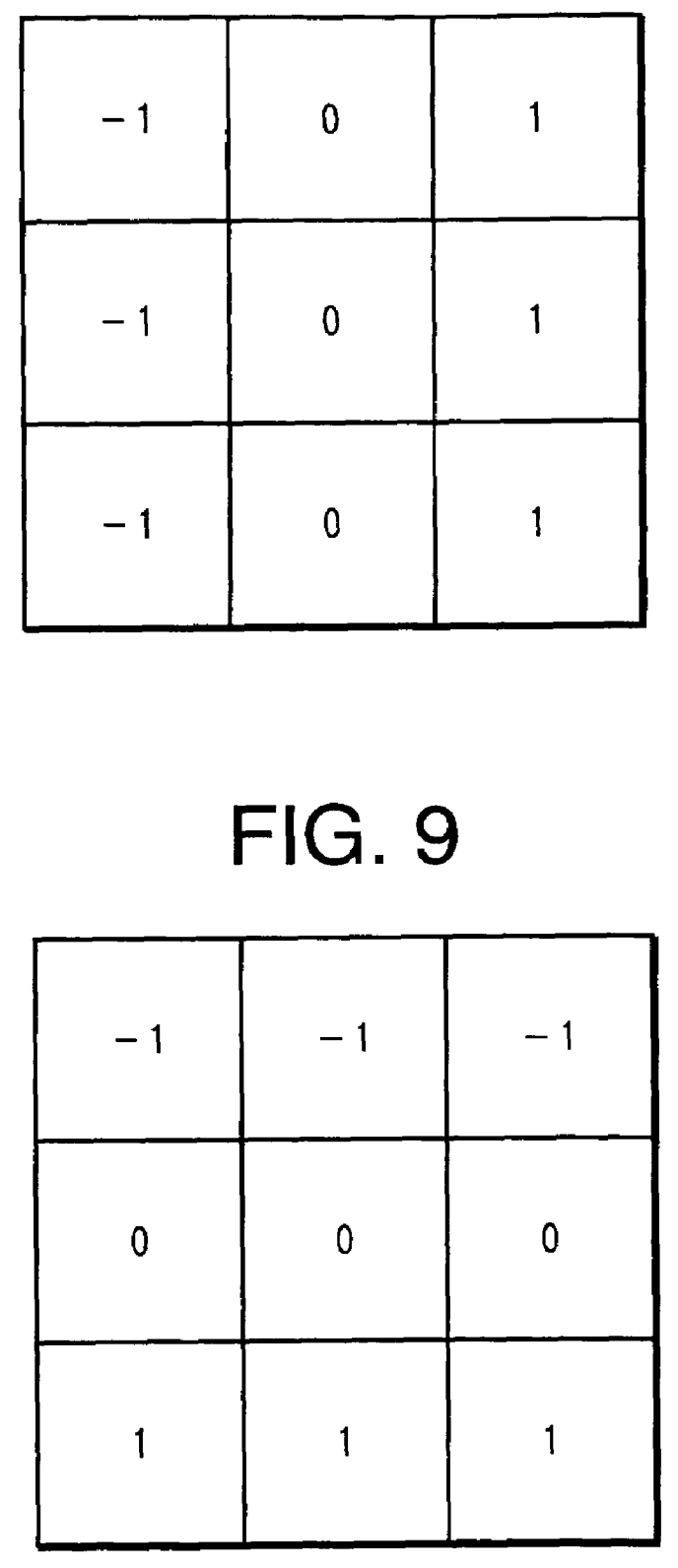

Next, referring to FIGS. 7 to 9, the operation of the personal computer 100 and the inkjet printer 200 according to the first embodiment will be explained.

FIG. 7 is a flowchart of an image data processing procedure. FIG. 8 shows an example of an X-direction first-order differential filter to be applied to each component of L*a*b*, respectively, to obtain a color-difference vector of the notice pixel. FIG. 9 shows an example of a Y-direction first-order differential filter to be applied to each component of the L*a*b*, respectively, to obtain a color-difference vector of the notice pixel.

In procedures executed in the personal computer 100, image data is created as so-called RGB type image data. When a user gives an instruction to print out the image data, the image data processing program is called and started up by the application or the OS.

As shown in FIG. 7, when the image data to be printed is input, the image data is stored in an input image data storage area 132 (S10).

Then, process requires the user to input the direction of the grooves of the recording medium (e.g., a fabric) and when the direction of the grooves on the medium is input, it is stored in a work area 131 (S11). In this exemplary embodiment, the medium is a fabric, that is, a T-shirt. The direction of the grooves on the medium is defined as a direction of the grooves formed due to irregularities on the fabric surface of the T-shirt or ones formed between yarns caused by stitching methods such as knitting or weaving with regard to the T-shirt. In general, since the ink moves largely in the direction of these grooves when reached on the fabric, the ink is apt to blot along the direction of the grooves. The user is requested to enter a specified direction arbitrarily as the direction of the grooves on the recording medium, or the T-shirt.

Figure 15:
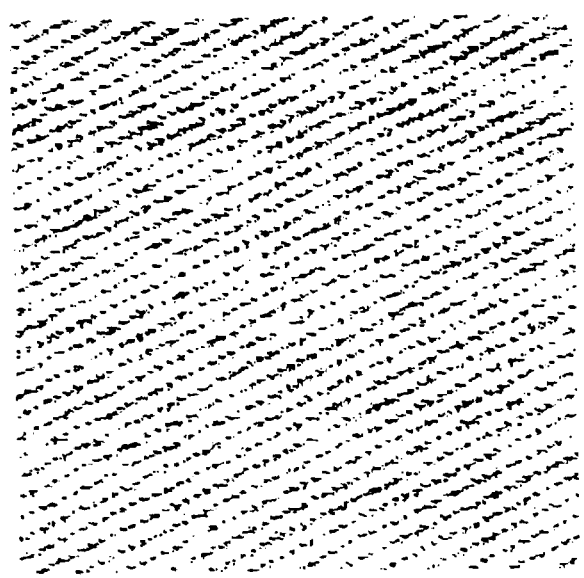
FIG. 15 is an enlarged view of the fabric showing grooves thereon.

For example, when the T-shirt is woven as shown in FIG. 15, the direction in which the grooves extend on the medium (i.e., the T-shirt) is from the lower left to the upper right in FIG. 15. In this case, the user may enter "the direction from the lower left to the upper right" as the specified direction of the grooves on the medium by operating the keyboard 181 and the mouse 182 on a given input screen displayed on a monitor 171. Incidentally, it should be noted that the specified direction entered by the user need not coincide with the direction of the grooves on the medium, but the specified direction may be entered at user's discretion.

In the following steps, from S15 to S50, the image data is processed sequentially for all pixels making up the image data. Specifically, one notice pixel (a target pixel) is first selected from the pixels making up the image data in the step S15 (S15).

Then, data for the notice pixel (target pixel) and eight neighboring pixels surrounding the notice pixel is retrieved into the work area 131. Then, the thus retrieved RGB type pixel data is converted into the L*a*b* format data and the CMYK format image data.

In general, the image data, which is displayed on a monitor of a personal computer and edited consists of a plurality of pixels. Each pixel has brightness (gray-scale) data for each of three primary colors, red(R), green(G) and blue (B). Such brightness is indicated by the value ranges from 0 to 255. When the brightness for the three primary colors (RGB) is all zero, the pixel is shown in black. When the brightness is all 255, the pixel is shown in white. Furthermore, when the brightness is 255 for R and 0 for both G and B, the pixel is shown in red. In this manner, it is possible to display about 16.77 million colors using so-called 8-bit color image data.

There are many kinds of monitors which have different characteristics. Accordingly, pixels having the same values for each of R, G and B components may appear to be different colors depending on monitors. For example, a pixel which appears in red on one monitor may appear in pink when the pixel is displayed on another monitor even if the value for each of the three primary colors (RGB) is unchanged. In order to avoid the above deficiency, an L*a*b* format has been generally used as a standard for enabling a color image to be displayed in the same color regardless of the type of the monitors.

According to the L*a*b* format, the pixel color is represented by a combination of factors of L* (brightness), a* (the degree of color which changes from red to green), and b* (the degree of color which changes from blue to yellow). By providing each monitor with a conversion table (Profile), which enables the L*a*b* format to be converted into the RGB format according to individual characteristic, the pixel color uniquely determined by the L*a*b* format can be seen on any monitors as the same color.

Such L*a*b* format for a standard of color enables the user to recognize an image having the same color through data handling between individual apparatuses, irrespective of apparatus's property, with regard to the image data scanned by a scanner and printed by a printer as well, without limited to the color adjustments made between monitors. The profiles of these apparatuses are generally provided by manufacturers of each apparatus.

Conversion from the L*a*b* format into a CMYK format can be performed. Such a conversion is carried out by referring to a profile which is generated based on the characteristic of the inkjet printer 200. For example, the profile of the inkjet printer 200 is created and provided, as described below, by an experiment in advance. A pseudo-gradation processing for providing 256-level gradation data is output as output of the printer 200 is carried out for all combinations of CMYK values to generate printing data, which is printed by the inkjet printer 200. Then, the value of the L*a*b* is determined by measuring the printed image with a calorimeter. Based on the measurement result, a table defining the relationship between the L*a*b* and the CMYK is created, which is provided as a profile based on the characteristic of the inkjet printer 200. Since all combinations of the CMYK values turns out to be enormous quantity, the color measurement may be carried out only for given combinations, and according to the result, interpolation is carried out for the combinations of the CMYK values which are not measured.

The CMYK format is for expressing a color to be printed with four colors, cyan (C), magenta (M), yellow (Y) and additionally black (K) each of which having a density value of, for example, 0 to 255, by dividing the color into three primary color components. Thicker portion is indicated by higher density value, and thinner portion by lower density value. In the inkjet printer, if the density value of a pixel is high, the probability that the ink is ejected in the vicinity of the pixel increases when the pseudo-gradation processing such as well known error diffusion method is carried out.

In the image data processing procedure, the data of the selected pixel is converted from the RGB format into the L*a*b* format and the CMYK format (S16). Since a profile of the monitor 171 is generally stored in the information storage area 153 of the HDD 150 when the monitor 171 is set up, the profile is referred to and data of each pixel is converted into the L*a*b* format and the CMYK format. If the is not available, the data is converted into a general value using a known calculating formula.

Then, data of the target pixel (notice pixel) and eight adjacent pixels surrounding the target pixel is stored in the work area 131, and the color-difference vector of the target pixel is calculated (S17).

The color-difference vector of the target pixel is calculated as described below. With reference to the target pixel and eight adjacent pixels, respectively, the first-order differential filter shown in FIG. 8 is applied to each component of L*a*b* in the X direction, and the first-order differential filter shown in FIG. 9 is applied to each component of L*a*b* in the Y direction. In each of FIGS. 8 and 9, the center pixel is the target pixel and eight pixels surrounding the target pixel are the adjacent pixels. The right-and-left direction and up-and-down direction in FIGS. 8 and 9 correspond to the X direction and Y direction, respectively.

When an X-direction first-order differential value for the L*, a*, b*, is represented by dL*x, da*x, db*x, and that a Y-direction first-order differential value for the L*, a*, b*, is represented by dL*y, da*y, db*y, respectively:

The color-difference vector for L*, a*, b* is, $$dL^* = (dL^*x, dL^*y)$$

$$da^* = (da^*x, da^*y)$$

$$db^* = (db^*x, db^*y)$$

That is to say, when the hue is close between the target pixel and adjacent pixels and the brightness is also close, the color-difference vector has a small value.

In S18, the directional component of the color difference vector in the direction of the grooves on the medium is calculated based on the direction of the grooves entered in S11 and the color-difference vector obtained in S17. That is, the directional component, which indicates the degree of color change in the direction of the grooves on the medium entered in the step S11, of the color-difference vector of the target pixel obtained in the step S17 is calculated.

The directional component of the color difference vector in the direction of the grooves on the medium is calculated as follows.

When an angle in the direction of the grooves on the medium entered in the step S11 is "θ", the directional component of each color-difference vector for L*, a*, and b* is expressed as:

$$CL^* = dL^*x \cdot \cos\theta + dL^*y \sin\theta$$

$$Ca^* = da^*x \cdot \cos\theta + da^*y \cdot \sin\theta$$

$$Cb^* = db^*x \cdot \cos\theta + db^*y \cdot \sin\theta$$

The directional component in the direction of the grooves on the medium for the target pixel is calculated by the following formula.

$$C = \infty\sqrt{(CL^*)^2 + (Ca^*)^2 + (Cb^*)^2}$$

Thus, if the degree of color change in the direction of the grooves on the medium for the target pixel is small, the directional component is small.

When the directional component thus calculated is smaller (S20: NO) than a predetermined threshold value A (for example, 10) obtained, for example by an experiment in advance, it is determined that the degree of color change in the direction of the grooves on the medium for the target pixel (notice pixel) is sufficiently small, and thus the blot is inconspicuous if any.

In the output image data storage area 133, the CMYK format data, which is converted in S16 as data for the notice pixel, is stored. When the CMYK format data is stored, the processing for the notice pixel currently selected is finished, and the operation proceeds to the step S50 to perform the processing for the next pixel.

If the directional component is equal to or more than the threshold value A (S20: YES), the sum of the density values of the notice pixel and the adjacent pixels (a neighboring total density value) is then calculated (S22). The neighboring total density value is calculated as a sum of the C values, M values, Y values, and K values of nine pixels including the notice pixel and the adjacent pixels.

If the neighboring total density value thus calculated is smaller (S25: NO) than the threshold value B2 (for example, 6885) obtained by an experiment in advance, it is determined that the amount of the ink ejected onto an area consisting of the nine pixels (i.e., the notice pixel and adjacent pixels) is not so much as to cause the blot. In this case, the data for the notice pixel, which has already been converted in S16 into the CMYK format, is stored in the output image data storage area 133. Thus, the processing for the notice pixel currently selected is finished, and the operation proceeds to step S50 to perform the processing for the next pixel.

If the neighboring total density value is equal to or greater than the threshold value B2 (S25: YES), the value is further compared with a threshold value B3 (for example, 8032) which has been obtained, for example, by an experiment (S30).

If the neighboring total density value is less than the threshold value B3 (S30: NO), the density value D of the notice pixel is decreased by a predetermined reduction value D1 (for example, 80) previously obtained, for example, by an experiment (S35). If the neighboring total density value is equal to or greater than the threshold value B3 (S30: YES), the density value D of the notice pixel is decreased by a reduction value D2 (for example, 60) previously obtained by an experiment (S36).

Since similar processing is carried out both in S35 and S36, only the processing in S35 is explained below. Provided that the reduction value D1 as an amount for decreasing the density value D of the notice pixel is determined, the rate for decreasing each value of C, M, Y and K in the same proportions is calculated according to the following formula:

$$Rate = (D-D1)/D$$

Then, the density values after decreased, i.e., the values of C1, M1, Y1 and K1 are calculated respectively for the values of C, M, Y and K, according to the following formulae:

$$C1 = C \times Rate$$

$$M1 = M \times Rate$$

$$Y1 = Y \times Rate$$

$$K1 = K \times Rate$$

The density values of C1, M1, Y1, and K1 thus calculated are stored into the output image data storage area 133 as data for the notice pixel currently selected. This completes the processing for the notice pixel currently selected and the operation proceeds to S50 to carry out the processing for the next notice pixel.

Incidentally, since each data for the next selected notice pixel and its adjacent pixels is retrieved from the input image data storage area 132 into the work area 131, unprocessed data will be read according to the original image data, even if, for example, one of the adjacent pixels of the notice pixel previously processed is selected as the target pixel.

It should be noted that, the larger the neighboring total density value thus obtained is greater, the higher the probability of a drop of ink being ejected to the notice pixel and its adjacent pixels is. If a jet of ink containing moisture is ejected concentrative to a small area, there exists a great deal of droplets of ink in that area and the ink will bleed before being dried to cause the blot.

According to the embodiment, based on the result of comparison between the neighboring total density value and the threshold value B3, either the reduction value D2 or the reduction value D1 larger than the reduction value D2 is decided to decrease the density value D of the notice pixel.

It should be noted that the invention need not be limited to such a configuration. That is, the threshold value of the neighboring total density value may further be subdivided so that the reduction value for decreasing the density value D of the notice pixel grows larger as the neighboring total density value increases, thus allowing finer fractionation.

In S50, control judges whether the processing in S15 through S36 has been executed for all the pixels of the image data (S50). If there are pixels which have not yet been processed (S50: NO), control returns to step S15 where the above-described processing is repeated. When the processing has been carried out for all pixels (S50: YES), the image data processing procedure is finished.

In the personal computer 100, the image data in the CMYK format processed in the image data processing procedure is temporarily stored in the printing queue 154 of the HDD 150, and then sent to the inkjet printer 200. Alternatively, the image data is converted into the printing data directly representing the ink ejected from the inkjet head 241 before temporarily stored in the printing queue 154, and then sent to the inkjet printer 200.

In the latter case, the image data is converted into the printing data indicating whether a drop of ink is to be ejected (for example, by means of pseudo gradation processing such as publicly known error diffusion method) at each of positions where the ink can be ejected within the area of the T-shirt to reproduce the pixels, according to the values of C, M, Y, and K of each pixel. In the former case, the conversion of the received image data into the printing data is executed in the printer 200.

In the inkjet printer 200, the received printing data is stored in the receiving buffer 232. Then, from the data stored in the storage area of the receiving buffer 232 is sequentially sent, from the smaller address, to the printing buffer 234 before the printing operation is started.

When a feed motor 253 is driven, the T-shirt is transferred in the direction perpendicular to the direction in which a carriage (not shown) of the inkjet printer 200 moves reciprocates. One surface of the T-shirt faces the inkjet head 241 mounted on the carriage. The T-shirt is fed in the sub-scanning direction while the carriage moves in the main-scanning direction, and the ink is ejected onto the T-shirt according to the printing data.

Since, with reference to the image to be printed, for a portion of the image to be printed at which the color-difference vector has a relatively large amplitude of the directional component in the direction of the grooves on the medium and the density of the ink would be relatively high, the amount of the ink ejected to the portion is reduced in advance by the image data processing program (namely, probability of ink droplets ejected to the portion is lessened). Therefore, in such a portion, the blot will not occur. For a portion at which the amplitude of the directional component of the color-difference vector is relatively small, the degree of color change of the notice pixel in the direction of the grooves of the medium is relatively small. Therefore, in such a portion, even if the blot occurs, it will not be conspicuous. Therefore, according to the embodiment, the user can obtain a high-quality color image free from the blot.

It should be noted that the aforementioned numerical examples of the threshold values A, B2, B3, D1 and D2 are illustrative only. Each of these values differ depending on various factors such as characteristics of ink used for the inkjet printer 200, a quantity of one droplet of ink ejected from the inkjet head 241, and kind of fabric. Accordingly, it is preferable to determine optimum threshold values with an experiment when designing the inkjet printer 200.

Next, with reference to FIGS. 1 to 9 again, the operation of the personal computer 100 and the inkjet printer 200 according to the second embodiment is explained. As aforementioned, according to the second embodiment, the image data created by the application executed in the personal computer 100 is sent to the inkjet printer 200 as it is in the RGB format (i.e., without converting to the printing data). This can be accomplished by configuring the personal computer 100 such that the image data received from the application is sent to the inkjet printer 200 as it is by the driver of the inkjet printer 200 installed in the personal computer 100.

When the image data is transmitted, the image data received from the application is stored in the input image data storage area 132 of the RAM 130 shown in FIG. 2. After printing settings such as the number of printing and printing size are set, the image data is stored in the printing queue 154 of the HDD 150 shown in FIG. 3, thereby the image data being transmitted to the inkjet printer 200.

In the inkjet printer 200, the image data received from the personal computer 100 is stored in the receiving buffer 232 of the RAM 230. Then, the image data processing procedure shown in FIG. 7 is executed. The image data processing procedure is the same as that of the first embodiment executed in the personal computer 100.

Namely, a part of the image data to be processed (data of the selected notice pixel and its adjacent pixels) is retrieved from the receiving buffer 232 and stored into the work area 231. After processed, the part of the image data is stored in the output image data storage area 233. When the processing is applied to all the pixels of the image data, the image data processing procedure is finished. The created printing data is converted into the printing data which indicates whether the drop of ink is ejected and is stored in the printing buffer 234. Then, similarly to the first embodiment, the ink is ejected in accordance with the printing data stored in the printing buffer 234.

As described above, in the personal computer 100 and the inkjet printer 200 according to the first and second embodiments, the image data processing procedure is executed to create the printing data from the image data created by the application. According to the first embodiment, the image data processing program is executed by the personal computer 100, while it is executed by the inkjet printer 200 according to the second embodiment.

In the image data processing procedure, all pixels contained in the image data are sequentially selected, and the directional component of the color-difference vector in the direction of the grooves on the medium and the neighboring total density value of the notice pixel and adjacent pixels are calculated. Then, judgments are made according to respective threshold values to determine whether the density value D of the notice pixel is decreased. When the color-difference vector has large directional component in the direction of the grooves on the medium, it is likely that the blot becomes conspicuous if a great deal of ink droplets are ejected to such pixels. Therefore, when the directional component of the color-difference vector in the direction of the grooves on the medium is relatively large and a relatively large amount of ink would be ejected as the neighboring total density value is high, an amount of the ink droplets ejected to the notice pixel (probability) can be reduced by decreasing the density value D of the notice pixel. By applying this image processing procedure to all the pixels contained in the image data to be printed, the blot of the image obtained as a result of printing can be prevented.

It should be noted that various modification may be made without departing from the scope of the present invention. For example, in the first and second embodiments, the reduction value by which the density value D of the notice pixel is reduced is determined according to the neighboring total density value. This can be modified such that the reduction value may be determined according to the directional component C of the color-difference vector in the direction of the grooves on the medium as shown in FIG. 10, which is a flowchart showing an example of modified image data processing procedure.

Figure 10:
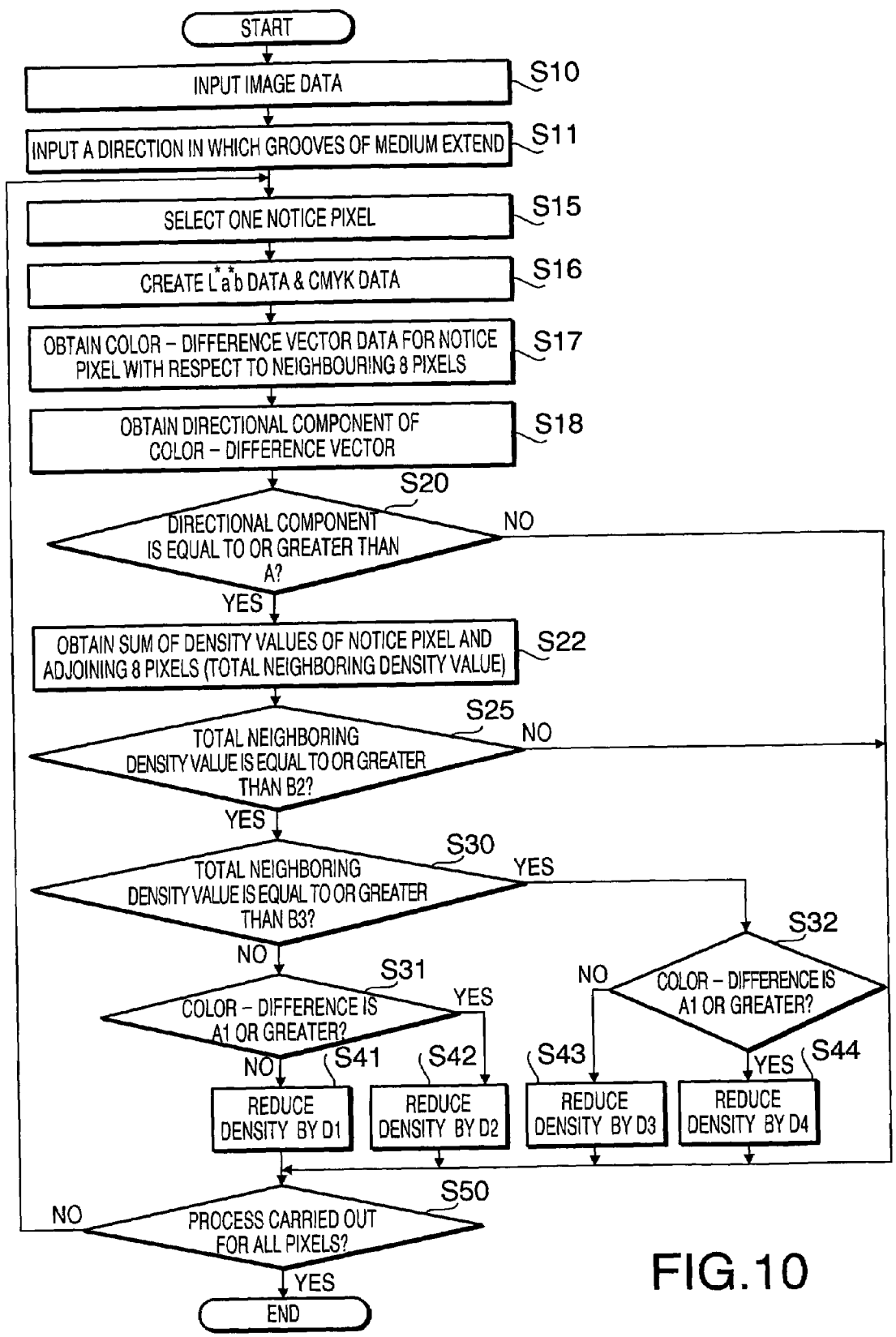
FIG. 10 is a flowchart of a modification of the image data processing procedure.

In FIG. 10, steps S10 to S30 are similar to those in the image data processing procedure of the first and second embodiments. In this modification, when the neighboring total density value of the notice pixel and the adjacent pixel is smaller than the threshold value B3 (S30: NO), a comparison of the directional component C with a threshold value A1 (for example, 15) preliminarily obtained with an experiment is performed (S31). The threshold value A1 is greater than the threshold value A in the first and second embodiments.

Then, if the directional component C is smaller than the threshold value A1 (S31: NO), the reduction value D1 (for example, 70) is set (S41), and the density value D of the notice pixel is decreased similarly to the first and second embodiments. If the directional component C is equal to or greater than the threshold value A1 (S31: YES), the reduction value D2 (for example, 80) is set (S42), and the density value D of the notice pixel is decreased similarly to the first and second embodiments. According to the modification, if the reduction value D2 is greater than the reduction value D1 and the reduction value has a greater value as the directional component C has a grater value, the amount of ink ejected to the notice pixel, which may easy to blot due to a relationship with the adjacent pixels, can be reduced effectively.

When the neighboring total density value of the notice pixel and the adjacent pixels is equal to or greater than the threshold value B3 (S30: YES), the value of the directional component C is compared with the threshold value A1 (S32). Then, if the directional component C is smaller than the threshold value A1 (S32: NO), the reduction value D3 (for example, 90) is set (S43), and the density value D of the notice pixel is decreased similar to the first and second embodiments. If the directional component C is equal to or greater than the threshold value A1 (S32: YES), the reduction value D4 (for example, 100) is set (S44), and the density value D of the notice pixel is decreased similar to the first and second embodiments. Similar to the above, the blot can be reduced by making the reduction value D3 greater than the reduction value D4.

After the density value D of the notice pixel is decreased according to the reduction value thus determined, next notice pixel is selected similarly to the first and second embodiments (S50: NO; S15). In this manner, when the image has been processed for all pixels of the image data (S50: YES), the image data processing procedure is completed.

Optionally, in S31 or S32, by further subdividing the threshold value of the directional component C, the reduction value for decreasing the density value D of the notice pixel becomes larger as the directional component C increases, thus allowing finer fractionation.

In the first and second embodiments, the reduction value D of the notice pixel is determined by a judging procedure referring to the threshold values of the directional component C and the neighboring total density value. This can be modified such that the reduction value is determined by referring to a table according to the directional component C and the neighboring total density value.

Figure 11:
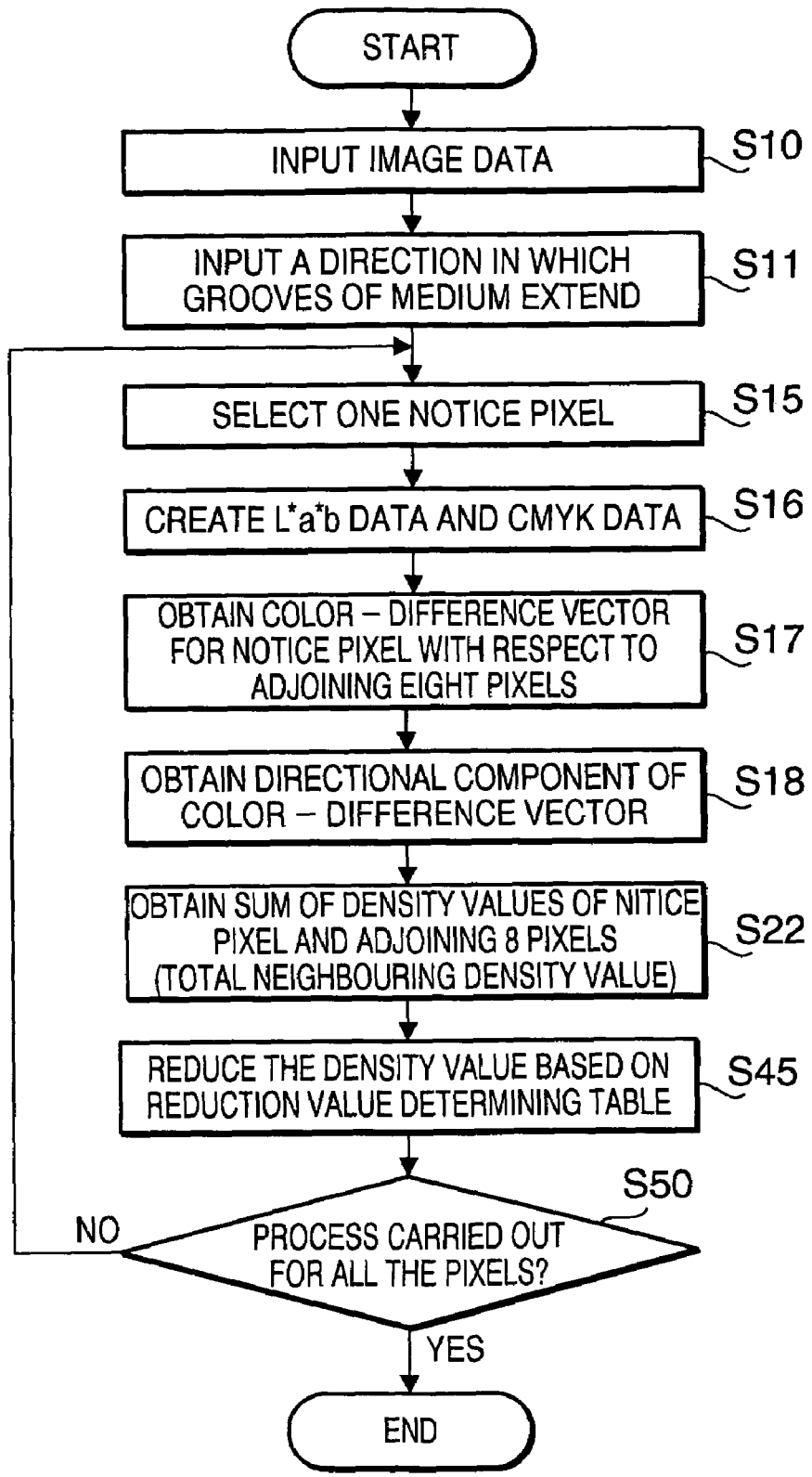
FIG. 11 is a flowchart of another modification of the image data processing procedure.

FIG. 11 is a flowchart showing a modification of the image data processing procedure. As in the first and second embodiments, steps S10 to S18 are executed and then step S22 is conducted to determine the directional component C and the neighboring total density value of the notice pixel and the adjacent pixels. Then, in S45, the reduction value of the density value D of the notice pixel is decided by referring to the reduction value deciding table shown in FIG. 12.

Figures 12, 13:
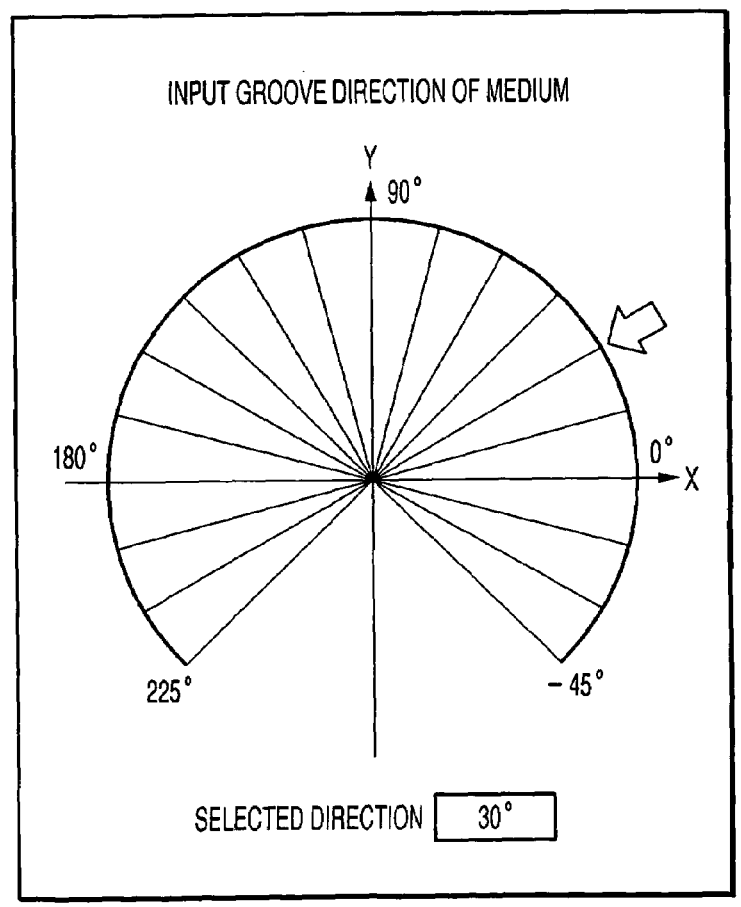
FIG. 12 is a conceptual diagram showing a reduction value deciding table.
FIG. 13 is an example of an input screen for inputting a direction grooves on a medium.

As shown in FIG. 12, the reduction value deciding table is a table from which 16-level reduction values D1 to D16 can be selected in accordance with the directional component C and the neighboring total density value (denoted by "E"). The directional component C is classified into four zones (equal to or greater than A1 and less than A2, equal to or greater than A2 and less than A3, equal to or greater than A3 and less than A4, equal to or greater than A4 and less than A5: A1<A2<A3<A4<A5), and the neighboring total density value E is similarly classified into four zones (equal to or greater than B1 and less than B2, equal to or greater than B2 and less than B3, equal to or greater than B3 and less than B4, equal to or greater than B4 and less than B5: B1<B2<B3<B4<B5). And, the table is set so that the reduction value is selected from D1 to D16.

For example, when the directional component C is equal to or greater than A1 and less than A2 and the neighboring total density value E is equal to or greater than B1 and less than B2, the reduction value D1 is selected as the value by which the density value D of the notice pixel is decreased. As an example, when A1=0, A2=10, B1=0 and B2=6885, D1 may be taken as "0". These are only exemplary values and may differ depending on various factors such as the property of the ink, the amount per one ink droplet being emitted and kind of fabrics.

As shown in FIG. 11, similar to the first and second embodiments, the reduction value D of the notice pixel is decreased according to the reduction value decided by referring to the reduction value deciding table (S45). Similarly, the next notice pixel is subsequently selected (S50: NO, S15). When all the pixels of the image data have been processed (S50: YES), the image data processing procedure is finished.

In the first and second embodiments, a user input a specified direction spontaneously as the direction of the grooves on the medium in S11. This may be modified such that a specified directional pattern table (not shown) indicating a plurality of patterns of the direction of the grooves on the medium is stored in the ROM 120 or the RAM 130, and an input screen may be displayed on the monitor 171 according to the specified directional pattern table in S11 so that the user may operate the keyboard 181 or the mouse 182 to select a desired direction from the plurality of specified directions as the direction of the grooves on the medium.

FIG. 13 shows an example of the input screen through which the user inputs the direction of the grooves on the medium. In FIG. 13, a plurality of directional patterns are indicated to form fan-shaped patterns. The directional patterns represent angles from −45° to 225° at intervals of 15°. The users may select a desired angle (direction) as the specified direction by operating an arrow shown on the screen using the keyboard 181 or the mouse 182.

Additionally, it is known that the direction of the grooves on the medium can also be specified based on the stitching method such as materials of fabrics (recording medium) or knitting (weaving) manners. Accordingly, the specified direction can be input as follows. Firstly, a specified directional pattern table (not shown) storing a plurality of patterns in the direction of the grooves on the medium in relation with the materials of fabrics and/or the stitching methods is stored in the ROM 120 or the RAM 130. The user may specify one of the materials of fabrics or the stitching methods by operating the keyboard 181 or the mouse 182 through the input screen displayed on the monitor 171. Then, a direction of the grooves on the medium may be selected from the table based on the materials of the fabrics and/or the stitching methods specified by the user. In this case, the user may specify only one of the materials of the fabrics or one of the stitching methods, or both the material of the fabric and the stitching method.

Incidentally, as the information to specify the direction of the grooves on the medium, various information such as manufacturers or distributors of the fabrics, kinds of applicable fabrics such as T-shirt or dress shirt as well as the materials of the fabrics and/or the stitching methods can be referred to. The direction of the grooves on the medium can be specified by any one of such information.

It should be noted that, in S11, the user may enter a plurality of specified directions as the direction of the grooves on the medium. In this case, the processing for obtaining the directional component Ci for all of a plurality of the entered directions "i" is carried out (S15 to S18), and the user can take a directional component Ci with the largest value out of the directional component Ci thus obtained.

Furthermore, the personal computer 100 and the inkjet printer 200 may be configured to carry out a predetermined test printing to print an predetermined image on the fabrics in response to the instructions from the user. For example, the user may prepare a piece of testing fabric which is made of the same kind of fabric as a T-shirt (recording medium). The user may have the testing fabric held by a platen (not shown) and give an instruction with the personal computer 100 to perform the test printing. Then, the personal computer 100 sends a command to execute the predetermined test printing to the inkjet printer 200. In response to the test printing execution command, the inkjet printer 200 executes the predetermined test printing on the testing fabric.

Figure 14:
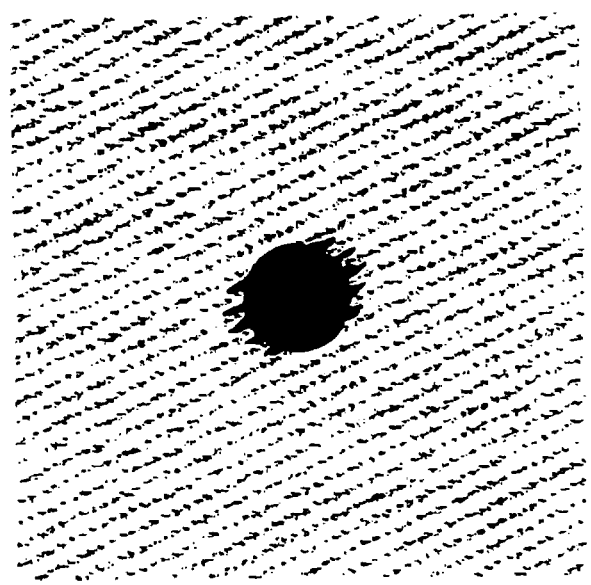
FIG. 14 is an enlarged view of a fabric on which a test printing has been carried out.

FIG. 14 is an enlarged view of a fabric after the test printing has been carried out. By the test printing, for example, a substantially circular pattern is printed in black (K) ink on the testing fabric. The direction that the black (K) ink bleeds (blots) on the testing fabric can be identified by this test printing. In the example shown in FIG. 14, the bleeding of the ink occurs in the direction from the lower left to the lower right in the drawing. Therefore, in this case, the user can enter the direction of the grooves on the medium in S11 according to the result of the test printing.

By executing the test printing, the user can easily recognize the direction that the ink is apt to bleed, and enter the accurate direction of the grooves on the medium as the specified direction in S11.

Incidentally, although a decision is made whether or not the density value D of the notice pixel is decreased based on the directional component C and the neighboring total density value E in the first and second embodiments, a decision may be made based on the color-difference dC in addition to the density value D of the notice pixel is decreased based on the directional component C and the neighboring total density value E. The color-difference dC is a value for indicating the color-difference between the notice pixel and the eight adjacent pixels surrounding the notice pixel.

The color-difference dC is calculated as described below. In the X direction, for each of the notice pixel and eight adjacent pixels, the first-order differential filter shown in FIG. 8 is applied to each of the L*a*b*, and the first-order differential filter shown in FIG. 9 is filtered to each of the L*a*b* in the Y direction. In FIGS. 8 and 9, the center pixel represents the notice pixel, and eight pixels surrounding the notice pixel represent the adjacent pixels. The direction X is the horizontal direction (right-to-left direction) in each drawing, and the direction Y is the vertical direction (up-down direction in the drawing).

Given that first-order differential values in the X direction for the L*, a* and b*, are dL*x, da*x and db*x, and first-order differential values in the Y direction for the L*, a* and b* are dL*y, da*y and db*y, the color-difference dC is calculated according to the following equation:

$$dC = \sqrt{(dL*x)^2 + (dL*y)^2 + (da*x)^2 + (da*y)^2 + (db*x)^2 + (db*y)^2}$$

That is to say, when hue and brightness between the notice pixel and the adjacent pixels is close, the color-difference dC has a smaller value.

Then, similar to the first or second embodiment in which the differential component C and the neighboring total density value E are referred to, the reduction value of the density value D of the notice pixel may be determined by comparing the color-difference dC with a threshold value obtained in advance with an experiment, or the reduction value may be determined by referring to the table according to the directional component C, the neighboring total density value E, and further the color-difference dC. In this manner, i.e., by including the color-difference dC as a factor when the reduction value is determined, an amount of ink droplets (probability) ejected to the notice pixel can be reduced more appropriately, thus definitely preventing the occurrence of the blot.

The directional component C is determined in accordance with each value of L*a*b*. This may be simplified such that the directional component C is determined only from the brightness (L*). Namely, the reduction value is determined such that the larger the degree of brightness change in the direction of the grooves on the medium for the notice pixel is, the larger the reduction value is.

Although the image data is converted from the RGB format into the L*a*b* format and the CMYK format by the processing in S16 in FIG. 7, this may be simplified such that the image data is converted from the RGB format only to the CMYK format (without converting to the L*a*b* format), and the image data is processed according to each value of the CMYK.

Optionally, although the RGB format image data is sent to the inkjet printer 200 in the second embodiment, the image data converted into the L*a*b* format by the personal computer 100 may be sent to the inkjet printer 200.

Incidentally, in the image data processing procedure according to the embodiment, the image data entered in the RGB format is processed and output as image data in the CMYK format. This procedure can be modified such that the image data in the CMYK format is converted into another format data such as image data in the RGB format or the L*a*b* format by conducting appropriate step after S50 of FIG. 7. Further, by installing the image data processing program capable of conducting such processing as a part of the functions of the image browsing application or the image editing application, the image can be processed while the image data is being edited or before the image data is printed out. Alternatively, instead of installing such functions in the application, they may be supplied as a plug-in module or an independent application capable of executing such functions.

It should be noted that, although a case where the RGB format image data is input is explained in the first and second embodiments as an example, the image data entered in the image data processing program is not limited to the RGB format, but may be in other data formats such as L*a*b and CMYK formats.

Incidentally, the personal computer 100 is only an example of the image data processing device according to the present invention, and the invention is applicable to any device which is connected to the inkjet recording apparatus and can send the image data or the printing data. For example, the invention can be applied to scanner, facsimile machine and digital camera. The invention can also be applied to a copier or a multi-function peripheral, etc., which integrally provided with a printing data creating apparatus and an inkjet recording apparatus.

The present disclosure relates to the subject matter contained in Japanese Patent Application No. 2003-435245, filed on Dec. 26, 2003, which is expressly incorporated herein by reference in its entirety.

What is claimed is:

1. An image data processing device, comprising:
a pixel selecting system that selects a notice pixel from among a plurality of pixels constituting an image, all the plurality of pixels being determined as the notice pixel sequentially;
a specified direction inputting system through which a specified direction is input, the specified direction being a direction in which ink ejected on a recording medium would move by a relatively large amount on the recording medium;
a color-difference vector calculating system that calculates a color-difference vector indicative of the magnitude and direction of a color-difference between the notice pixel selected by the pixel selecting system and neighboring pixels disposed adjacent to the notice pixel;
a directional component calculating system that calculates a directional component which is a component of the color-difference vector in the specified direction;
a neighboring total density value calculating system that calculates a total density value which is a sum of the density value of the notice pixel and density values of the neighboring pixels located adjacent to the notice pixel;
a density reduction value determining system that determines a density reduction value according to the directional component calculated by the directional component calculating system and the total density value calculated by the neighboring total density value calculating system; and
a density value reducing system that reduces the density value of the notice pixel by an amount represented by the density reduction value determined by the density reduction value deciding system.

2. The image data processing device according to claim 1, wherein the density reduction value determining system determines the reduction value such that the reduction value is greater as the total density value is greater.

3. The image data processing device according to claim 1, wherein the density reduction value determining system determines the reduction value such that the reduction value is greater as the directional component is greater.

4. The image data processing device according to claim 1, wherein the color-difference vector calculating system calculates the color-difference in accordance with a brightness of the notice pixel and brightness of the neighboring pixels.

5. The image data processing device according to claim 1, wherein:
the specified direction inputting system includes:
a specified directional pattern storing system that stores a plurality of specified directional patterns; and
a direction selecting system that is operable to select one of the plurality of specified directional patterns stored in the specified directional pattern storing system; and
the directional component calculating system calculates the directional component of the color-difference vector in the specified direction selected by the directional selecting system.

6. The image data processing device according to claim 1, wherein:
the specified direction inputting system includes:
a specified directional pattern storing system that stores a plurality of specified directional patterns;
a recording medium specifying system that is operable to specify at least one of a material and a stitching method of the recording medium; and
a specified direction identifying system that identifies the specified direction for the recording medium from among the plurality of specified directional patterns stored in the specified directional pattern storing system according to the at least one of the material and stitching method of the recording medium; and
the directional component calculating system calculates the directional component of the color-difference vector in the specified direction selected by the directional selecting system.

7. The image data processing device according to claim 1, wherein:

the neighboring total density value calculating system includes:
- a directional component comparing system that compares the directional component calculated by the directional component calculating system with a predetermined threshold value;
- a first total density value comparing system that compares the neighboring total density value calculated by the neighboring total density value calculating system with a first threshold value; and
- a second total density value comparing system that compares the total density value calculated by the neighboring total density value calculating system with a second threshold value which is greater than the first threshold value; and when the directional component comparing system determines the directional component is greater than the predetermined threshold value, the density reduction value determining system determines the reduction value as a first reduction value if the total density value is smaller than the second threshold value, while the density reduction value determining system determines the reduction value as a second reduction value if the total density value is greater than the second threshold value.

8. A method of processing image data, comprising:
- selecting a notice pixel from among a plurality of pixels constituting an image, all the plurality of pixels being determined as the notice pixel sequentially;
- obtaining a specified direction in which ink ejected on a recording medium would move by a relatively large amount on the recording medium;
- first calculating a color-difference vector indicative of the magnitude and direction of a color-difference between the notice pixel and neighboring pixels disposed adjacent to the notice pixel;
- second calculating a directional component which is a component of the color-difference vector in the specified direction;
- third calculating a total density value which is a sum of the density value of the notice pixel and density values of the neighboring pixels;
- determining a density reduction value according to the directional component and the total density value; and
- reducing the density value of the notice pixel by an amount represented by the density reduction value.

9. The method according to claim 8, wherein the determining determines the reduction value such that the reduction value is greater as the total density value is greater.

10. The method according to claim 8, wherein the determining determines the reduction value such that the reduction value is greater as the directional component is greater.

11. The method according to claim 8, wherein the first calculating calculates the color-difference in accordance with brightness of the notice pixel and brightness of the neighboring pixels.

12. The method according to claim 8, wherein:
the inputting includes selecting one of a plurality of specified directional patterns; and
the second calculating calculates the directional component of the color-difference vector in the selected specified direction.

13. The method according to claim 8, wherein:
the inputting includes:
- specifying at least one of a material and a stitching method of the recording medium; and
- identifying the specified direction for the recording medium from among a plurality of specified directional patterns according to the at least one of the material and stitching method of the recording medium; and the second calculating calculates the directional component of the color-difference vector in the identified specified direction.

14. The method according to claim 8, wherein:
the third calculating includes:
- comparing the directional component with a predetermined threshold value;
- comparing the neighboring total density value with a first threshold value; and
- comparing the total density value with a second threshold value which is greater than the first threshold value; and when the directional component is greater than the threshold value, the reduction value is determined as a first reduction value if the total density value is smaller than the second threshold value, while the reduction value is determined as a second reduction value if the total density value is greater than the second threshold value.

15. A computer-readable storage medium storing a computer-executable program that causes a computer to:
- select a notice pixel from among a plurality of pixels constituting an image, all the plurality of pixels being determined as the notice pixel sequentially;
- obtain a specified direction in which ink ejected on a recording medium would move by a relatively large amount on the recording medium;
- first calculate a color-difference vector indicative of the magnitude and direction of a color-difference between the notice pixel and neighboring pixels disposed adjacent to the notice pixel;
- second calculate a directional component which is a component of the color-difference vector in the specified direction;
- third calculate a total density value which is a sum of the density value of the notice pixel and density values of the neighboring pixels;
- determine a density reduction value according to the directional component and the total density value; and
- reduce the density value of the notice pixel by an amount represented by the density reduction value.

16. A printing system, comprising:
an image data creating apparatus that creates image data;
an image processing device that processes the image data to generate processed image data;
a printing data generating device that converts the processed image data to printing data; and
an inkjet printer which ejects ink onto a recording medium in accordance with the printing data;
the image processing device including:
- a pixel selecting system that selects a notice pixel from among a plurality of pixels constituting an image, all the plurality of pixels being determined as the notice pixel sequentially;
- a specified direction inputting system through which a specified direction is input, the specified direction being a direction in which ink ejected on a recording medium would move by a relatively large amount on the recording medium;
- a color-difference vector calculating system that calculates a color-difference vector indicative of the magnitude and direction of a color-difference between the notice pixel selected by the pixel selecting system and neighboring pixels disposed adjacent to the notice pixel;

a directional component calculating system that calculates a directional component which is a component of the color-difference vector in the specified direction;

a neighboring total density value calculating system that calculates a total density value which is a sum of the density value of the notice pixel and density values of the neighboring pixels located adjacent to the notice pixel;

a density reduction value determining system that determines a density reduction value according to the directional component calculated by the directional component calculating system and the total density value calculated by the neighboring total density value calculating system; and a density value reducing system that reduces the density value of the notice pixel by an amount represented by the density reduction value determined by the density reduction value deciding system.

17. The printing system according to claim 16, wherein the image data creating device includes the image data processing device and the printing data generating device, the image data creating device further including a printing data transmitting device that transmits the printing data to the inkjet printer.

18. The printing system according to claim 16, wherein:
the image data creating device includes an image data transmitting device that transmits the image data to the inkjet printer; and
the inkjet printer includes the image data processing device and the printing data generating device, the image data processing device processed the image data received from the image data creating device, the processed image data being converted into the printing data, the inkjet printer carrying out a printing operation based on the printing data.

19. An image data creating device, comprising:
an image data creating system that is used to create image data representing an image to be printed by an inkjet printer;
an image data processing system that processes the image data created by the image data creating system, the image data processing system including:
  a pixel selecting system that selects a notice pixel from among a plurality of pixels constituting the image to be printed, all the plurality of pixels being determined as the notice pixel sequentially;
  a specified direction inputting system through which a specified direction is input, the specified direction being a direction in which ink ejected on a recording medium would move by a relatively large amount on the recording medium;
  a color-difference vector calculating system that calculates a color-difference vector indicative of the magnitude and direction of a color-difference between the notice pixel selected by the pixel selecting system and neighboring pixels disposed adjacent to the notice pixel;
  a directional component calculating system that calculates a directional component which is a component of the color-difference vector in the specified direction;
  a neighboring total density value calculating system that calculates a total density value which is a sum of the density value of the notice pixel and density values of the neighboring pixels located adjacent to the notice pixel;
  a density reduction value determining system that determines a density reduction value according to the directional component calculated by the directional component calculating system and the total density value calculated by the neighboring total density value calculating system; and
  a density value reducing system that reduces the density value of the notice pixel by an amount represented by the density reduction value determined by the density reduction value deciding system;
a printing data generating system that generates printing data in accordance with the processed image data; and
a printing data transmitting system that transmits the printing data to the inkjet printer.

20. The image data creating device according to claim 19, wherein the density reduction value determining system determines the reduction value such that the reduction value is greater as the total density value is greater.

21. The image data creating device according to claim 19, wherein the density reduction value determining system determines the reduction value such that the reduction value is greater as the directional component is greater.

22. The image data creating device according to claim 19, wherein the color-difference vector calculating system calculates the color-difference in accordance with a brightness of the notice pixel and brightness of the neighboring pixels.

23. The image data creating device according to claim 19, wherein the specified direction inputting system includes:
a specified directional pattern storing system that stores a plurality of specified directional patterns; and
a direction selecting system that is operable to select one of the plurality of specified directional patterns stored in the specified directional pattern storing system, wherein the directional component calculating system calculates the directional component of the color-difference vector in the specified direction selected by the directional selecting system.

24. The image data creating device according to claim 19, wherein:
the specified direction inputting system includes:
  a specified directional pattern storing system that stores a plurality of specified directional patterns;
  a recording medium specifying system that is operable to specify at least one of a material and a stitching method of the recording medium; and
  a specified direction identifying system that identifies the specified direction for the recording medium from among the plurality of specified directional patterns stored in the specified directional pattern storing system according to the at least one of the material and stitching method of the recording medium; and
the directional component calculating system calculates the directional component of the color-difference vector in the specified direction selected by the directional selecting system.

25. The image data creating device according to claim 19, wherein:
the neighboring total density value calculating system includes:
  a directional component comparing system that compares the directional component calculated by the directional component calculating system with a predetermined threshold value;
  a first total density value comparing system that compares the neighboring total density value calculated by the neighboring total density value calculating system with a first threshold value; and
  a second total density value comparing system that compares the total density value calculated by the neighboring total density value calculating system with a second threshold value which is greater than the first threshold value; and when the directional component comparing system determines the directional component is greater than the predetermined threshold value, the density reduction value determining system determines the reduction value as a first reduction value if the total density value is smaller than the second threshold value, while the density reduction value determining system determines the reduction value as a second reduction value if the total density value is greater than the second threshold value.

26. An inkjet printer, comprising:
a data receiving system that receives image data created outside the inkjet printer;
an image data processing system that processes the image data received by the data receiving system, the image data processing system including:
 a pixel selecting system that selects a notice pixel from among a plurality of pixels constituting the image to be printed, all the plurality of pixels being determined as the notice pixel sequentially;
 a specified direction inputting system through which a specified direction is input, the specified direction being a direction in which ink ejected on a recording medium would move by a relatively large amount on the recording medium;
 a color-difference vector calculating system that calculates a color-difference vector indicative of the magnitude and direction of a color-difference between the notice pixel selected by the pixel selecting system and neighboring pixels disposed adjacent to the notice pixel;
 a directional component calculating system that calculates a directional component which is a component of the color-difference vector in the specified direction;
 a neighboring total density value calculating system that calculates a total density value which is a sum of the density value of the notice pixel and density values of the neighboring pixels located adjacent to the notice pixel;
 a density reduction value determining system that determines a density reduction value according to the directional component calculated by the directional component calculating system and the total density value calculated by the neighboring total density value calculating system; and
 a density value reducing system that reduces the density value of the notice pixel by an amount represented by the density reduction value determined by the density reduction value deciding system; and
a printing data generating system that generates printing data in accordance with the processed image data, the inkjet printer carrying out a printing operation based on the printing data.

27. The inkjet printer according to claim 26, wherein the density reduction value determining system determines the reduction value such that the reduction value is greater as the total density value is greater.

28. The inkjet printer according to claim 26, wherein the density reduction value determining system determines the reduction value such that the reduction value is greater as the directional component is greater.

29. The inkjet printer according to claim 26, wherein the color-difference vector calculating system calculates the color-difference in accordance with a brightness of the notice pixel and brightness of the neighboring pixels.

30. The inkjet printer according to claim 26,
wherein the specified direction inputting system includes:
 a specified directional pattern storing system that stores a plurality of specified directional patterns; and
 a direction selecting system that is operable to select one of the plurality of specified directional patterns stored in the specified directional pattern stonng system, wherein the directional component calculating system calculates the directional component of the color-difference vector in the specified direction selected by the directional selecting system.

31. The inkjet printer according to claim 26,
wherein:
the specified direction inputting system includes:
 a specified directional pattern storing system that stores a plurality of specified directional patterns;
 a recording medium specifying system that is operable to specify at least one of a material and a stitching method of the recording medium; and
 a specified direction identifying system that identifies the specified direction for the recording medium from among the plurality of specified directional patterns stored in the specified directional pattern storing system according to the at least one of the material and stitching method of the recording medium; and
the directional component calculating system calculates the directional component of the color-difference vector in the specified direction selected by the directional selecting system.

32. The inkjet printer according to claim 26,
wherein:
the neighboring total density value calculating system includes:
 a directional component comparing system that compares the directional component calculated by the directional component calculating system with a predetermined threshold value;
 a first total density value comparing system that compares the neighboring total density value calculated by the neighboring total density value calculating system with a first threshold value; and
 a second total density value comparing system that compares the total density value calculated by the neighboring total density value calculating system with a second threshold value which is greater than the first threshold value; and
when the directional component comparing system determines the directional component is greater than the predetermined threshold value, the density reduction value determining system determines the reduction value as a first reduction value if the total density value is smaller than the second threshold value, while the density reduction value determining system determines the reduction value as a second reduction value if the total density value is greater than the second threshold value.

33. The inkjet printer according to claim 26, further comprising:
a test print instruction system through which a user instructs to carry out a test printing operation; and
a test print control system that controls the inkjet printer to carry out the test printing operation in response to the instruction of the test printing operation.

34. The inkjet printer according to claim 33,
wherein the test print control system controls the inkjet printer to print a substantially circular shape filled with black ink on the recording medium.

* * * * *